US008510558B2

(12) United States Patent
Sundaram

(10) Patent No.: US 8,510,558 B2
(45) Date of Patent: Aug. 13, 2013

(54) IDENTITY BASED AUTHENTICATED KEY AGREEMENT PROTOCOL

(75) Inventor: Ganapathy S. Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 1111 days.

(21) Appl. No.: 12/372,242

(22) Filed: Feb. 17, 2009

(65) Prior Publication Data

US 2010/0211779 A1 Aug. 19, 2010

(51) Int. Cl.
*H04L 9/32* (2006.01)

(52) U.S. Cl.
USPC .......................................................... 713/171

(58) Field of Classification Search
None
See application file for complete search history.

(56) References Cited

U.S. PATENT DOCUMENTS

| 6,886,096 | B2 | 4/2005 | Appenzeller et al. | |
| 7,017,181 | B2 | 3/2006 | Spies et al. | |
| 7,113,594 | B2 | 9/2006 | Boneh et al. | |
| 2004/0123098 | A1* | 6/2004 | Chen et al. | 713/155 |
| 2004/0179684 | A1 | 9/2004 | Appenzeller et al. | |
| 2005/0084100 | A1 | 4/2005 | Spies et al. | |
| 2005/0187877 | A1* | 8/2005 | Tadayon et al. | 705/51 |
| 2007/0041583 | A1* | 2/2007 | Boneh et al. | 380/28 |

FOREIGN PATENT DOCUMENTS

| EP | 0535863 A2 | 4/1993 |
| JP | 07-098563 A | 4/1995 |
| JP | 2004282657 A | 10/2004 |
| JP | 2005141200 A | 6/2005 |
| JP | 2007208410 A | 8/2007 |
| JP | 2007295366 A | 11/2007 |
| JP | 2010004288 A | 1/2010 |
| JP | 2010537541 A | 12/2010 |
| WO | 03017559 | 2/2003 |
| WO | 2004047352 | 6/2004 |

(Continued)

OTHER PUBLICATIONS

X. Cao et al., "Identity-Based Authenticated Key Agreement Protocols Without Bilinear Pairings," IEICE Transactions on Fundamentals of Electronics, Communications and Computer Sciences, Engineering Sciences Society, Dec. 2008, pp. 3833-3836, vol. E91-A, No. 12.*

(Continued)

*Primary Examiner* — Brandon Hoffman
(74) *Attorney, Agent, or Firm* — Ryan, Mason & Lewis, LLP

(57) ABSTRACT

A key agreement protocol between a first party and a second party comprises the following steps from the first party perspective. An encrypted first random key component is sent to the second party, the first random key component being encrypted using a public key of the second party in accordance with an identity based encryption operation. An encrypted random key component pair is received from the second party, the random key component pair being formed from the first random key component and a second random key component computed at the second party, and encrypted at the second party using a public key of the first party in accordance with the identity based encryption operation. The second random key component, in encrypted form, is sent to the second party, the second random key component being encrypted using the public key of the second party. A key for use in subsequent communications between the first party and the second party is computable at the first party based on the second random key component. The key may be computed at the second party based on the first random key component.

24 Claims, 2 Drawing Sheets

(56) References Cited

FOREIGN PATENT DOCUMENTS

| WO | 2005001629 | 1/2005 |
|---|---|---|
| WO | 2005010732 | 2/2005 |
| WO | 2005040975 | 5/2005 |
| WO | PCT/US2010/023736 | 10/2010 |

OTHER PUBLICATIONS

X. Cao et al., "Identify-Based Authenticated Key Agreement Protocols Without Bilinear Pairings," IEICE Transactions on Fundamentals of Electronics, Communications and Computer Sciences, Engineering Sciences Society, Dec. 2008, pp. 3833-3836, vol. E91-A, No. 12.

M.A. Azim et al., "An Efficient Elliptic Curve Cryptography Based Authenticated Key Agreement Protocol for Wireless LAN Security," IEEE, High Performance Switching and Routing, May 2006, pp. 376-380.

R.W. Zhu et al., "An Efficient Identify-Based Key Exchange Protocol with KGS Forward Secrecy for Low-Power Devices," Science Direct, Theoretical Computer Science, May 2007, pp. 198-207, vol. 378, No. 2.

D. Boneh et al., "Identity-Based Encryption from the Weil Pairing," Advances in Cryptology—Proceedings of Crypto, 2001, pp. 1-31, vol. 2139.

X. Boyen et al., "Identity-Based Cryptography Standard (IBCS) #1: Supersingular Curve Implementations of the BF and BB1 Cyptosystems," RFC 5091, Dec. 2007, pp. 1-63.

G. Appenzeller et al., "Identity-Based Encryption Architecture and Supporting Data Structures," RFC 5408, Jan. 2009, pp. 1-30.

\* cited by examiner

IDENTITY BASED AUTHENTICATED KEY AGREEMENT PROTOCOL

FIELD OF THE INVENTION

The present invention relates generally to cryptography and, more particularly, to an improved identity based authenticated key agreement protocol.

BACKGROUND OF THE INVENTION

Cryptography is a well-known technique for providing secure communication between two or more parties. Authenticated Key Agreement is a cryptographic protocol where two or more participants, authenticate each other and agree on a key for future communication. These protocols could be symmetric key or asymmetric public key protocols. Recall that symmetric key protocols require an out-of-band security mechanism to bootstrap a secret key, while public key protocols require certificates and large scale public key infrastructure (PKI). Clearly, public key methods are a bit more flexible, however, the requirement of certificates and a large scale public key infrastructure has proved to be challenging.

Recently, Identity Based Encryption (IBE) protocols have been proposed as a viable alternative to public key methods by simplifying the PKI requirements and replacing them with a simple Key Generation Function (KGF) to generate private keys. However, one significant limitation of existing IBE methods is that the KGF can end up being a de-facto key escrow server with undesirable consequences. That is, since the KGF in the existing IBE protocol generates each private key used in the protocol, KGF can therefore decrypt all exchanges. This is an undesirable consequence since if KGF was compromised by an intruder, then exchanges between the two parties operating under the protocol would be compromised as well.

Thus, a need exists for an improved identity based authenticated key agreement protocol.

SUMMARY OF THE INVENTION

Embodiments of the invention provide an improved identity based authenticated key agreement protocol.

For example, in one embodiment, a method for performing an identity based authenticated key agreement protocol between a computer system of a first party (the first party) and a computer system of a second party (the second party) comprises the following steps. An encrypted first random key component is sent from the first party to the second party, the first random key component having been computed at the first party and encrypted using a public key of the second party in accordance with an identity based encryption operation. An encrypted random key component pair is received at the first party from the second party, the random key component pair having been encrypted at the second party using a public key of the first party in accordance with the identity based encryption operation, and the random key component pair having been formed from the first random key component and a second random key component computed at the second party. The second random key component, in encrypted form, is sent from the first party to the second party, the second random key component having been encrypted using the public key of the second party in accordance with the identity based encryption operation. A key for use in subsequent communications between the first party and the second party is computable at the first party based on the second random key component. The key may be computed at the second party based on the first random key component.

Advantageously, embodiments of the invention provide an identity based authenticated key agreement protocol which does not suffer from the key escrow problem. Moreover, the protocol also provides perfect forward and backwards secrecy since computed key information is unrelated to any past or future authenticated key agreement sessions. Additionally, embodiments of the invention may be applied to various key agreement applications, by way of example only, end-to-end key agreement for applications over wired/wireless networks, and key agreement for networking protocols such as secure proxy based route optimization protocols.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
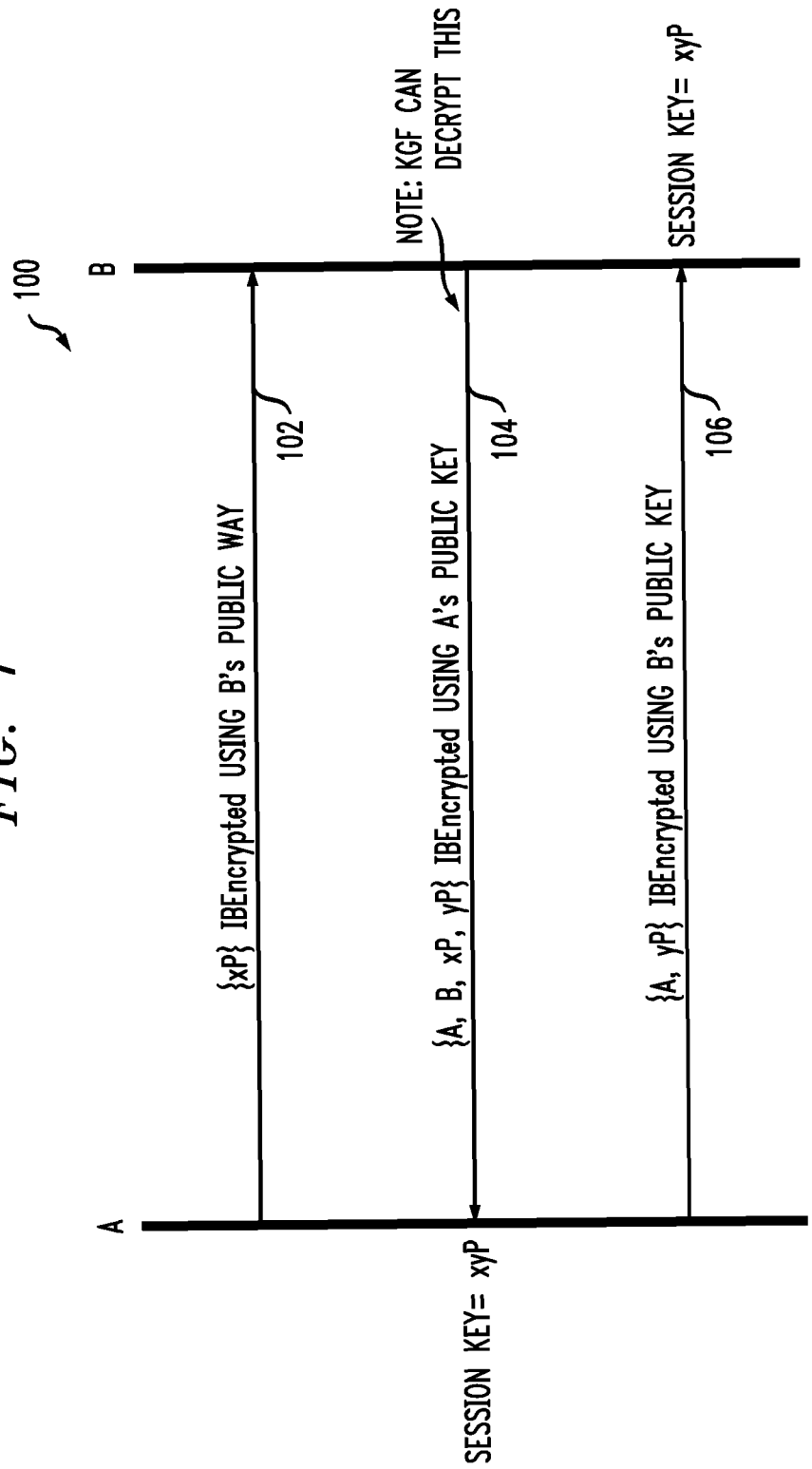
FIG. 1 is a flow diagram illustrating an identity based authenticated key agreement protocol in accordance with an embodiment of the present invention.

For ease of reference, the detailed description is divided as follows. An overview is provided of Identity Based Encryption (IBE) (section I). A review is provided of some examples of key agreement protocols including one involving IBE which has an inherent key escrow problem (section II). Embodiments of an improved identity based authenticated key agreement protocol according to the invention are then described in detail (section III) followed by a description of some illustrative applications (section IV). An illustrative computing system for implementing an improved identity based authenticated key agreement protocol according to the invention is then described (section V).

I. Identity Based Encryption

An Identity Based Encryption protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

The protocol involves the following mathematical tools and parameters:

Let E be an elliptic curve over a finite field F, and let P be a point of large prime order.

Let e: $E \times E \rightarrow G$ be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

Encryption$_A$(m)=(rP, m xor $H_2(g_A^r)$); in other words the encryption output of m has two coordinates u and v where u=rP and v=m xor $H_2(g_A^r)$. Note that "xor" refers to the exclusive OR logic function.

In order to decrypt (u,v), A recovers m using the following formula:

$$m = v \text{ xor } H_2(e(d_A,u)).$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

II. Key Agreement Protocols

There are primarily two categories of key agreement protocols—symmetric and asymmetric. Symmetric key agreement protocols rely on a secret key being shared between participants, and asymmetric key agreement protocols do not require participants to have any form of prior communications. Until recently, public key based key agreement protocols were the only asymmetric key agreement protocols, but the situation has since changed with the popularity of IBE based protocols. Examples of key agreement protocols are now provided.

Symmetric key based key agreement protocols are extremely popular. A typical example is the Authenticated Key Agreement (AKA) protocol used in 3G wireless systems. This is an example of a mutual authentication and session key agreement protocol based on a symmetric root key between the mobile subscriber's SIM (subscriber identification module) card and the home subscriber server. As pointed out above, symmetric key based key exchange protocols require the provisioning of a secret key between the participating entities.

Public key based key agreement protocols are used in many network layer and transport layer protocols and are based on certificates of public keys issued by a certificate authority. Examples include the public key version of the Internet Key Exchange (IKE) protocol used to derive a session key for IP (Internet Protocol) layer security protocols commonly referred to as IPsec. Another example is the key agreement protocol used in Secure Shell. All public key protocols used in an open setting require the use of certificates and a PKI.

Identity based key exchange protocols are gaining in popularity, and a simple example of an existing identity based protocol proposed for end-to-end encryption is where the entity originating the communication chooses a random key and encrypts it using the public key of the receiver and then transmits it. This transmission over an open network is secure because only the receiver can decrypt the message which contains the key. This existing protocol, while simple enough, does not authenticate the users prior to key exchange and suffers from the key escrow problems already described.

III. Identity Based Authenticated Key Agreement

In the illustrative embodiment described here, the basic set up for this protocol involves the mathematical constructs and parameters discussed in section I. Recall that this protocol is asymmetric but does not require any PKI support; instead the protocol employs an offline server which serves as a Key Generation Function. The details of the protocol are outlined below:

Suppose A, B are the two entities (or parties, where A represents a computer system of a first party and B represents a computer system of a second party) that are attempting to authenticate and agree on a key.

We will use A and B to represent their corresponding identities, which by definition also represent their public keys.

Let $H_1(A)=Q_A$ and $H_1(B)=Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$.

Let x be a random number chosen by A, and let y be a random number chosen by B.

FIG. 1 illustrates the protocol exchanges between A and B. The protocol exchange 100 comprises of the following steps:

A computes xP (i.e., P added to itself x times as a point on E, using the addition law on E) encrypts it using B's public key, and transmits it to B in step 102. In this step, encryption refers to identity based encryption described in section I above.

Upon receipt of the encrypted message, B decrypts the message and obtains xP. Subsequently B computes yP, and encrypts the pair {xP, yP} using A's public key and then transmits it to A in step 104.

Upon receipt of this message, A decrypts the message and obtains yP. Subsequently, A encrypts yP using B's public key and sends it back to B in step 106.

Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times. Note that any application of the protocol may utilize header data with the identities to ensure proper functioning of the protocol. This is relatively standard and applicable to almost any protocol exchange for key agreement.

Note also that x is random but xP provides no information about x. Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f is hard to compute without knowledge of x or y, and the output is of a satisfactory length from a cryptographic perspective, e.g., around 128 bits or more.

Some of the properties of the protocol include:

Immunity from key escrow: Observe that all the steps in the protocol exchange are encrypted using IBE. So clearly the KGF can decrypt all the exchanges. However, the KGF can not compute the session key. This is because of the hardness of the elliptic curve Diffie-Hellman problem. In other words, given xP and yP, it is computationally hard to compute xyP.

Mutually Authenticated Key Agreement: Observe that all the steps in the protocol exchange are encrypted using IBE. In particular, only B can decrypt the contents of the message sent by A in steps 102 and 106, and similarly only A can decrypt the contents of the message sent by B in step 104. Moreover, at the end of step 104, A can verify B's authenticity since xP could have been sent in step 104 only after decryption of the contents in step 102 by B. Similarly, at the end of step 106, B can verify A's authenticity since yP could have been sent back in step 106 only after correctly decrypting the contents of step 104 and this is possible only by A. Finally, both A and B can agree on the same session key. In other words, the protocol is a mutually authenticated key agreement protocol based on IBE. While the above description provides the motivation for the security of the protocol, a cryptographic proof of security can be easily provided. The hardness of the protocol relies on the hardness of the Elliptic curve Diffie-Hellman problem, which is influenced by the choice of elliptic curve.

Perfect forward and backwards secrecy: Since x and y are random, xyP is always fresh and unrelated to any past or future sessions between A and B.

No passwords: Clearly, the inventive protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

IV. Example Applications

Two example scenarios where the inventive protocol of FIG. 1 can be used are now described.

A. End-To-end Key Agreement

Existing and emerging Internet and wireless applications are increasingly supported over 'open' networks. In addition, due to the explosion of security attacks, users are waking up to the desire for end-to-end privacy. This applies to client-to-client applications (such as Voice-over-IP, Instant Messaging, etc.) as well as server to client applications (such as e-commerce over the web). In all these applications, it is often not possible to have the participants agree on a secret key to use symmetric key based key agreement protocols, or register with a PKI to obtain a certificate for use in public key based key agreement protocols. In fact, end-users involved in client-to-client communication (for example, voice calls) may not even know each other in advance. Moreover, end-users who desire privacy and security will be very averse to key escrow since there are significant opportunities for miscreants to abuse the system. In these situations, Identity Based Authenticated Key Agreement protocols are an extremely attractive option. All that is required is individuals register with a Key Generation Service with their identity and obtain a private key. In fact, it is not required for the Key Generation Service to be unique and applicable to all participants.

Observe that in protocol exchanges outlined in the previous section (illustratively describing the inventive protocol), the encryption steps 102 and 106 could be based on one curve (applicable to B) and the encryption in step 104 could be based on a completely different curve (applicable to A). This allows for Key Generation Services to act independent of each other. However, it is important to ensure that all the parameters needed for encryption are publicly and easily available through a directory service. More importantly xP and yP should correspond to the same elliptic curve, but could be independent of the elliptic curves used for encryption.

B. Secure Proxy Based Route Optimization

Mobile wireless networks have undergone a tremendous evolution and the next generation of systems are attempting to enlarge into a fully packet and IP based routed public land mobile wireless data network. This would require conventional services such as voice, to be supported over IP (i.e., mobile Voice-over-IP). In this regard, it has been recognized that while the radio network has undergone tremendous improvements, routing in the core network needs to be optimized.

An authenticated key agreement protocol between visited gateways may be used to set up a security association in order to securely forward packets between each other. In particular, these visited gateways could be on two different operator networks with no prior knowledge of each other and the operators who own these network elements may not even have any service level agreement. In such scenarios, Identity Based Authenticated Key Agreement protocols are a very attractive alternative. As in the previous example, it is not required for the Key Generation Service to be unique and applicable to all network elements. In fact, each network operator could own and operate a simple offline Key Generation Server.

Observe that in protocol exchanges outlined in the previous section (illustratively describing the inventive protocol), the encryption steps 102 and 106 could be based on one curve (applicable to B) and the encryption in step 104 could be based on a completely different curve (applicable to A). This allows for Key Generation Services to act independent of each other. However, it is important to ensure that all the parameters needed for encryption are publicly and easily available through a directory service. More importantly, xP and yP should correspond to the same elliptic curve, but could be independent of the elliptic curves used for encryption.

V. Illustrative Computing System

Figure 2:
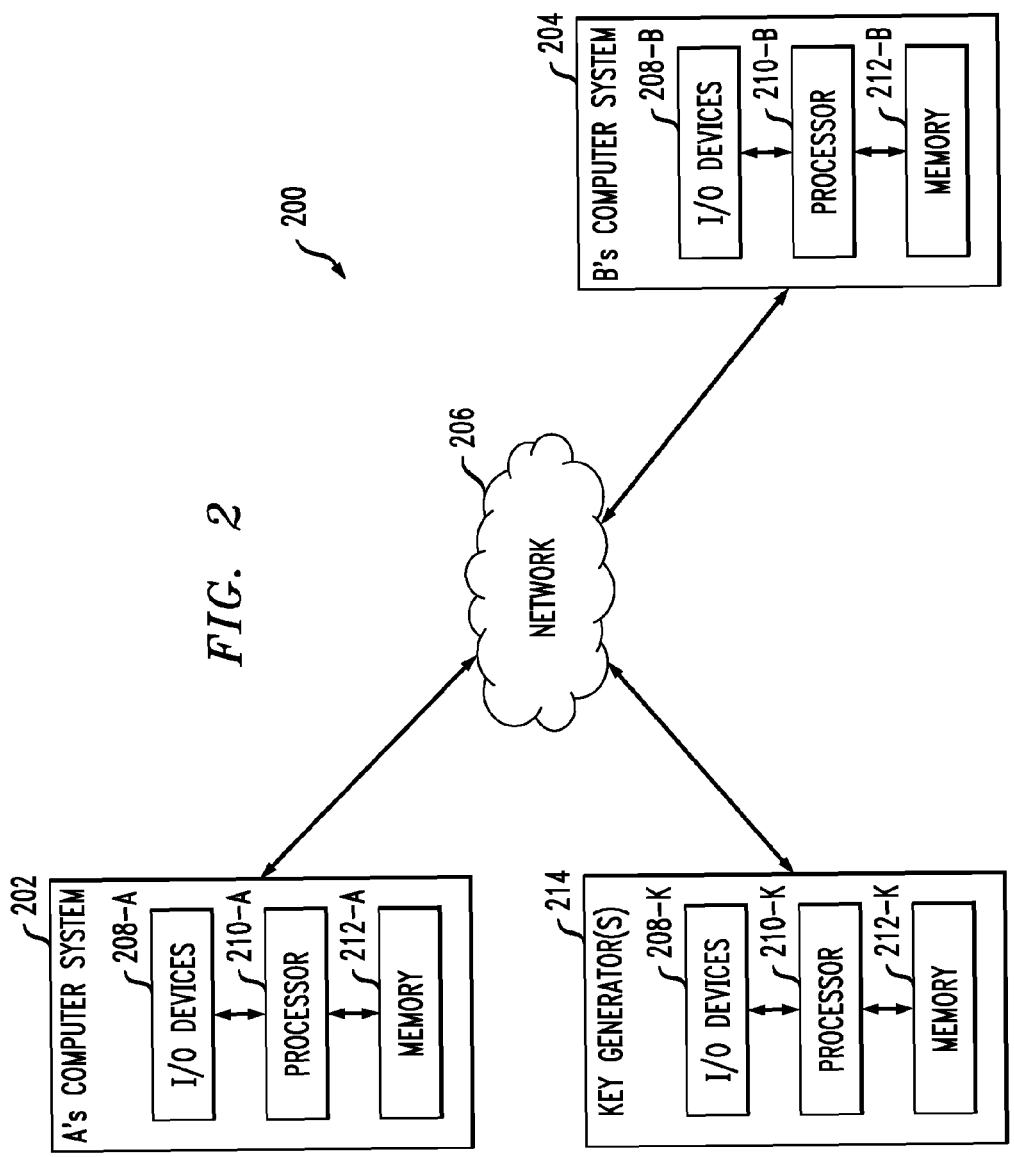
FIG. 2 is a block diagram illustrating a generalized hardware architecture of a data network and computer systems suitable for implementing one or more of the protocols according to embodiments of the present invention.

FIG. 2 illustrates a generalized hardware architecture of a data network and computer systems suitable for implementing an improved identity based authentication key agreement protocol between two entities A and B according to the present invention. As shown, entity A comprises a computer system 202, while entity B comprises a computer system 204. The two computer systems 202 and 204 are coupled via a data network 206. The data network may be any data network across which A and B desire to communicate, e.g., the Internet. However, the invention is not limited to a particular type of network. Typically, A could be a client machine and B could be a server machine. Also, A and B could both be clients or both be servers. Thus, it is to be understood that the communication protocol of the present invention is not limited to the case where A and B are client and server, but instead is applicable to any computing devices comprising A and B.

Also shown in computer system 214 coupled to computer systems 202 and 204 via network 206. Computer system 214 is preferably a server that performs a Key Generation Function or Service, as described above.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 2 generally illustrates an exemplary architecture for each computer system communicating over the network. As shown, computer system A comprises I/O devices 208-A, processor 210-A, and memory 212-A. Computer system B comprises I/O devices 208-B, processor 210-B, and memory 212-B. Computer system 214 (key generator(s)) comprises I/O devices 208-K, processor 210-K, and memory 212-K. It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing an identity based authenticated key agreement protocol between a computer system of a first party (the first party) and a computer system of a second party (the second party), the method at the first party comprising the steps of:
    sending an encrypted first random key component from the first party to the second party, the first random key component having been computed at the first party and encrypted using a public key of the second party in accordance with an identity based encryption operation;
    receiving an encrypted random key component pair at the first party from the second party, the random key component pair having been encrypted at the second party using a public key of the first party in accordance with the identity based encryption operation, and the random key component pair having been formed from the first random key component and a second random key component computed at the second party; and
    sending the second random key component, in encrypted form, from the first party to the second party, the second random key component having been encrypted using the public key of the second party in accordance with the identity based encryption operation;
    wherein a key for use in subsequent communications between the first party and the second party is computable at the first party based on the second random key component.

2. The method of claim 1, wherein the respective public keys used by the first party and the second party to perform the identity based encryption operation comprise a result of a hash function applied to information indicative of an identity of the respective party to which the public key is assigned.

3. The method of claim 1, wherein the first random key component, xP, is computed from a random number x chosen by the first party and a point P of large prime order on an elliptic curve over a finite field.

4. The method of claim 3, wherein the first random key component, xP, is computed by P being added to itself x times as a point on the elliptic curve.

5. The method of claim 1, wherein the second random key component, yP, is computed from a random number y chosen by the second party and the point P of large prime order on the elliptic curve over the finite field.

6. The method of claim 5, wherein the second random key component, yP, is computed by P being added to itself y times as a point on the elliptic curve.

7. The method of claim 1, wherein the key, xyP, for use in subsequent communications between the first party and the second party is computed at the first party from a random number x chosen by the first party and the second key component yP, yP having been computed at the second party from a random number y chosen by the second party and a point P of large prime order on an elliptic curve over a finite field.

8. The method of claim 7, wherein the key, xyP, for use in subsequent communications between the first party and the second party is computed by adding yP to itself x times.

9. The method of claim 1, wherein the key, xyP, for use in subsequent communications between the first party and the second party is computed at the second party from a random number y chosen by the second party and the first key component xP, xP having been computed at the first party from a random number x chosen by the first party and a point P of large prime order on an elliptic curve over a finite field.

10. The method of claim 9, wherein the key, xyP, for use in subsequent communications between the first party and the second party is computed by adding xP to itself y times.

11. The method of claim 1, wherein an elliptic curve used to compute the first random key component and the second random key component is independent of an elliptic curve used for the identity based encryption operation.

12. The method of claim 1, wherein an elliptic curve used for the identity based encryption operation performed by the first party is different than an elliptic curve used for the identity based encryption operation performed by the second party.

13. The method of claim 1, wherein respective private keys used by the first party and the second party to decrypt encrypted messages are assigned by a key generation function located on a computer system separate from the computer systems of the first party and the second party.

14. The method of claim 1, wherein the key for use in subsequent communications between the first party and the second party is used to form a session key.

15. The method of claim 14, wherein the session key is computed as a function of the key for use in subsequent communications between the first party and the second party.

16. The method of claim 1, wherein the authenticated key agreement protocol is performed as part of an end-to-end key agreement for an application over a network.

17. The method of claim 1, wherein the authenticated key agreement protocol is performed as part of a secure proxy based route optimization protocol.

18. The method of claim 1, wherein the key for use in subsequent communications between the first party and the second party is computable at the second party based on the first random key component.

19. A method for obtaining authenticated key agreement between a computer system of a first party (the first party) and a computer system of a second party (the second party), the method at the first party comprising the steps of:
    computing a first random key component at the first party;
    encrypting at the first party the first random key component, wherein the first random key component is encrypted using a public key of the second party in accordance with an identity based encryption operation;

sending the encrypted first random key component to the second party, wherein, at the second party: (i) the encrypted first random key component is decrypted to obtain the first random key component; (ii) a second random key component is computed; (iii) a random key component pair comprising the first random key component and the second random key component is formed and encrypted using a public key of the first party in accordance with the identity based encryption operation; and (iv) the encrypted random key component pair is sent to the first party;

decrypting at the first party the encrypted random key component pair to obtain the second random key component;

encrypting at the first party the second random key component, wherein the second random key component is encrypted using the public key of the second party in accordance with the identity based encryption operation;

sending the encrypted second random key component to the second party; and computing at the first party a key for use in subsequent communications between the first party and the second party, wherein the key is computed at the first party based on the second random key component, and wherein the key is computable at the second party based on the first random key component.

20. A method for performing an identity based authenticated key agreement protocol between a computer system of a first party (the first party) and a computer system of a second party (the second party), the method at the second party comprising the steps of:

receiving an encrypted first random key component from the first party at the second party, the first random key component having been computed at the first party and encrypted using a public key of the second party in accordance with an identity based encryption operation;

sending an encrypted random key component pair to the first party from the second party, the random key component pair having been encrypted at the second party using a public key of the first party in accordance with the identity based encryption operation, and the random key component pair having been formed from the first random key component and a second random key component computed at the second party; and receiving the second random key component, in encrypted form, from the first party at the second party, the second random key component having been encrypted using the public key of the second party in accordance with the identity based encryption operation;

wherein a key for use in subsequent communications between the first party and the second party is computable at the second party based on the first random key component.

21. The method of claim 20, wherein the key for use in subsequent communications between the first party and the second party is computable at the first party based on the second random key component.

22. A method for obtaining authenticated key agreement between a computer system of a first party (the first party) and a computer system of a second party (the second party), the method at the second party comprising the steps of:

receiving an encrypted first random key component at the second party from the first party, wherein, at the first party: (i) the first random key component is computed; (ii) the first random key component is encrypted using a public key of the second party in accordance with an identity based encryption operation; and (iii) the encrypted first random key component is sent to the second party;

decrypting the encrypted first random key component to obtain the first random, key component;

computing a second random key component;

forming a random key component pair comprising the first random key component and the second random key component;

encrypting the random key component pair using a public key of the first party in accordance with the identity based encryption operation;

sending the encrypted random key component pair to the first party, wherein, at the first party: (i) the encrypted random key component pair is decrypted to obtain the second random key component; (ii) the second random key component is encrypted using the public key of the second party in accordance with the identity based encryption operation, and (iii) the encrypted second random key component is sent to the second party; and computing at the second party a key for use in subsequent communications between the first party and the second party, wherein the key is computed at the second party based on the first random key component, and wherein the key is computable at the first party based on the second random key component.

23. Apparatus for performing an identity based authenticated key agreement protocol between a first party and a second party, the apparatus at the first party comprising:

a memory; and a processor coupled to the memory and configured to: (i) send an encrypted first random key component from the first party to the second party, the first random key component having been computed at the first party and encrypted using a public key of the second party in accordance with an identity based encryption operation; (ii) receive an encrypted random key component pair at the first party from the second party, the random key component pair having been encrypted at the second party using a public key of the first party in accordance with the identity based encryption operation, and the random key component pair having been formed from the first random key component and a second random key component computed at the second party; and (iii) send the second random key component, in encrypted form, from the first party to the second party, the second random key component having been encrypted using the public key of the second party in accordance with the identity based encryption operation; wherein a key for use in subsequent communications between the first party and the second party is computable at the first party based on the second random key component.

24. Apparatus for performing an identity based authenticated key agreement protocol between a first party and a second party, the apparatus at the second party comprising:

a memory; and a processor coupled to the memory and configured to: (i) receive an encrypted first random key component from the first party at the second party, the first random key component having been computed at the first party and encrypted using a public key of the second party in accordance with an identity based encryption operation; (ii) send an encrypted random key component pair to the first party from the second party, the random key component pair having been encrypted at the second party using a public key of the first party in accordance with the identity based encryption operation, and the random key component pair having been formed from the first random key component and a second random key component computed at the second party; and (iii) receive the second random key component, in encrypted form, from the first party at the second party, the second random key component having been encrypted using the public key of the second party in accordance with the identity based encryption operation; wherein a key for use in subsequent communications between the first party and the second party is computable at the second party based on the first random key component.

* * * * *